Feb. 3, 1931.  C. H. SLUGG  1,791,106
METHOD AND MACHINE FOR STRIPPING LEAD FROM CABLES
Filed Feb. 16. 1929   4 Sheets-Sheet 1
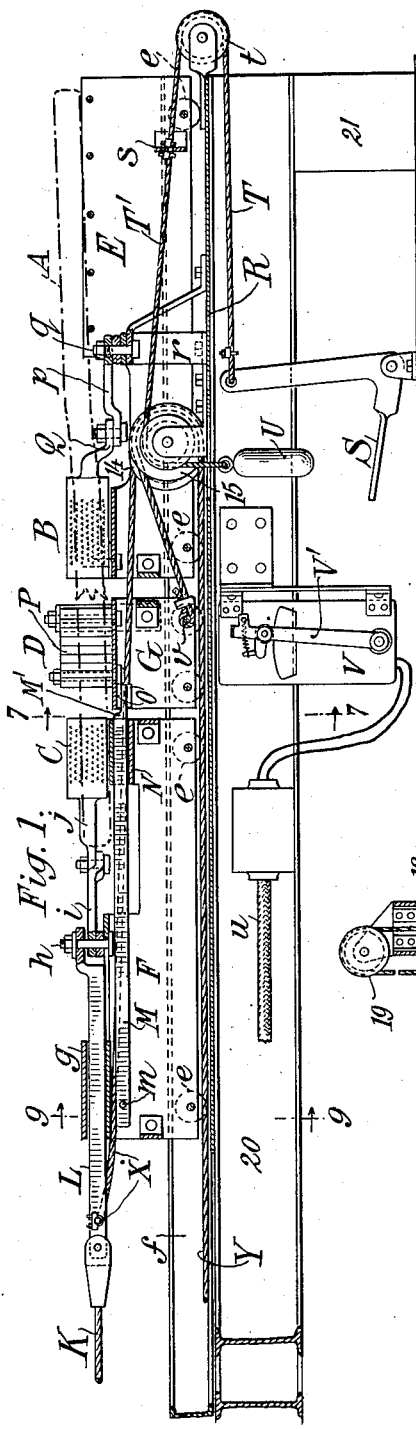
INVENTOR:
Clarence H. Slugg,
By Attorneys,
Fraser, Myers & Manley Feb. 3, 1931.   C. H. SLUGG   1,791,106
METHOD AND MACHINE FOR STRIPPING LEAD FROM CABLES
Filed Feb. 16, 1929   4 Sheets-Sheet 2
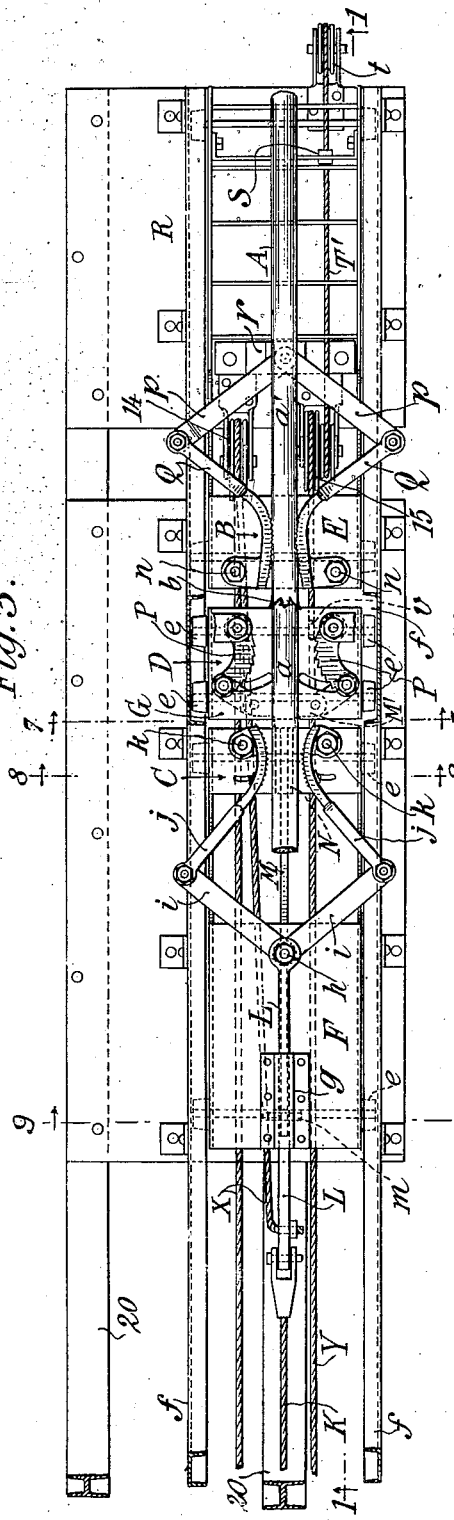
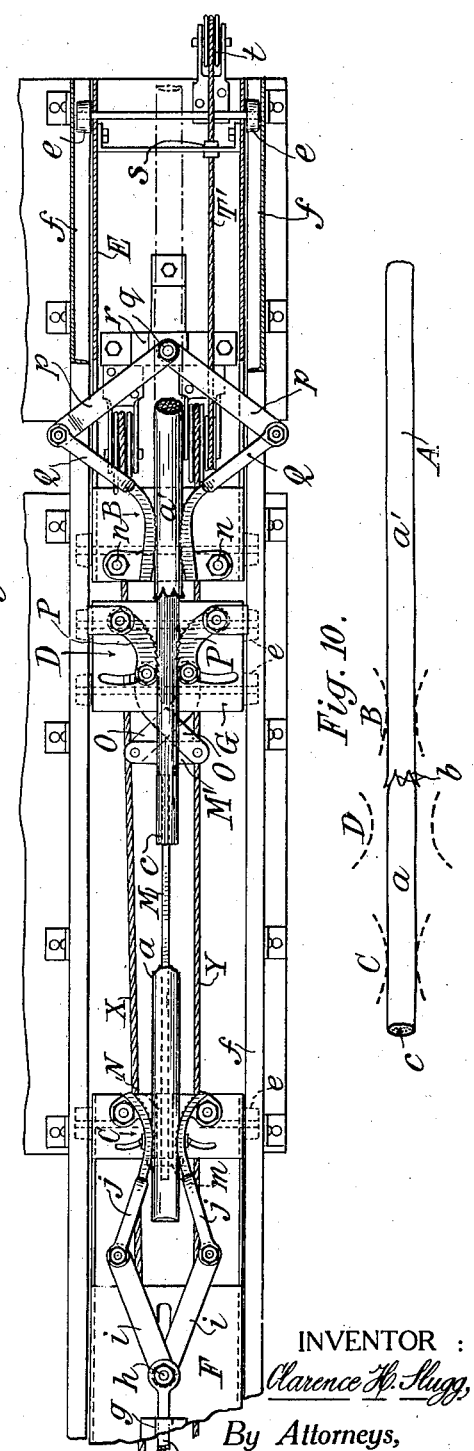
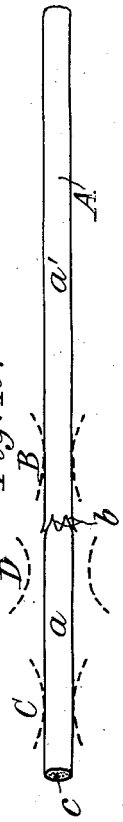
INVENTOR:
Clarence H. Slugg,
By Attorneys,
Fraser, Myers & Manley Feb. 3, 1931.  C. H. SLUGG  1,791,106
METHOD AND MACHINE FOR STRIPPING LEAD FROM CABLES
Filed Feb. 16, 1929   4 Sheets-Sheet 3
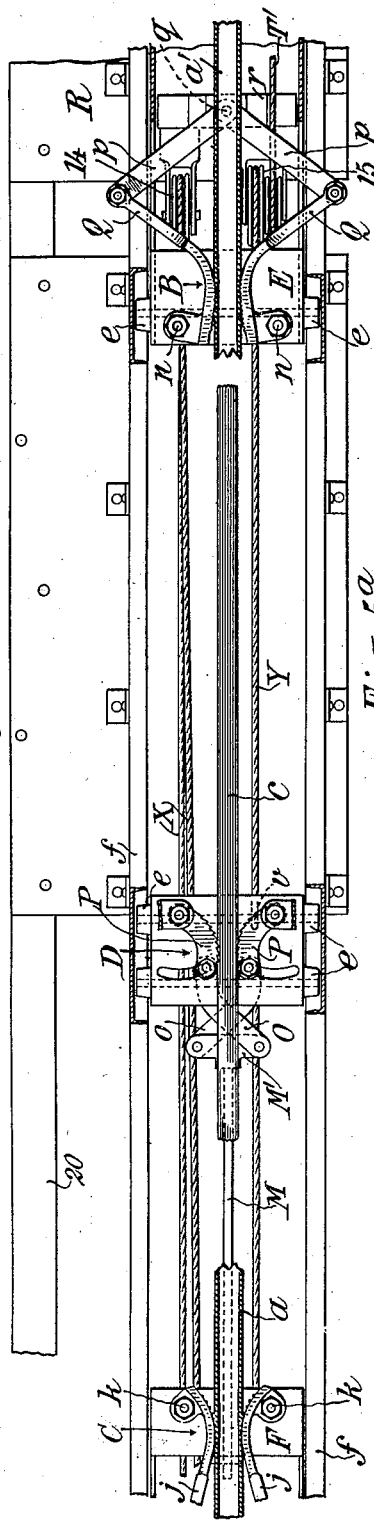
Fig. 5.
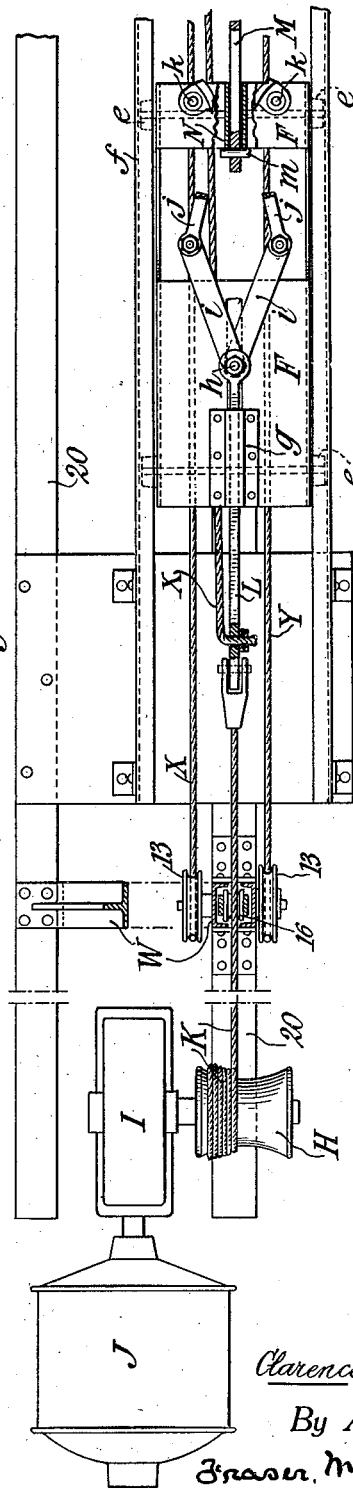
Fig. 5ª.
INVENTOR:
Clarence H. Slugg,
By Attorneys,
Fraser, Myers & Manley Feb. 3, 1931.     C. H. SLUGG     1,791,106
METHOD AND MACHINE FOR STRIPPING LEAD FROM CABLES
Filed Feb. 16, 1929     4 Sheets-Sheet 4

INVENTOR
Clarence H. Slugg,
By Attorneys,
Fraser, Myers + Manley

Patented Feb. 3, 1931

1,791,106

UNITED STATES PATENT OFFICE

CLARENCE H. SLUGG, OF CARTERET, NEW JERSEY, ASSIGNOR TO UNITED STATES METALS REFINING COMPANY, OF CARTERET, NEW JERSEY, A CORPORATION OF NEW JERSEY

METHOD AND MACHINE FOR STRIPPING LEAD FROM CABLES

Application filed February 16, 1929. Serial No. 340,360.

When used lead-covered electric cables are removed from conduits or other locations under conditions where they are no longer valuable except as scrap, difficulty is experienced in separating the lead sheathing from the insulated copper wires constituting the cable. Various expedients have been employed for stripping the lead from such cables, but the operation has heretofore proved troublesome and expensive, and has greatly reduced the value of the cables as scrap.

The present invention provides an improved mode and apparatus for stripping such cables which in practical use has proved to be operable, rapid and inexpensive.

Referring to the present invention, the cable, having been cut to convenient lengths (say about six or eight feet long), is acted on by three gripping means; one of these is a vise which engages one end portion of the lead sheath; another is a pulling gripper which engages another portion of the lead sheath, so that by separating the two gripping means the sheath, having been preferably weakened between, is pulled apart, one portion being stripped from the cable and the other portion remaining thereon; the third gripper then engages the stripped cable, and this and the first gripper or vise being moved apart, the cable is pulled out from the remaining portion of the lead sheath; or the latter is pulled off from the cable, as the case may be, thereby completing the stripping. It is then only necessary to open the grippers and remove the cable and the two severed portions of lead sheath.

In the preferred construction of apparatus for practising this method, the grippers, or at least two of them, are carried on travelers which may be conveniently formed as cars or carriages movable on suitable tracks or slideways; one of the grippers, preferably the vise first mentioned, may be so mounted, or may be mounted fixedly, as preferred; operative means are provided for opening and closing the respective grippers; operative means are also provided for moving the respective travelers so as to perform the described operations in suitable succession. Means are also provided for returning the parts after each operation to their initial positions.

The preferred embodiment of the invention is illustrated in the accompanying drawings, wherein—

Figure 1 is a side elevation of the apparatus partly in vertical longitudinal section.

Fig. 1ª is a continuation of the apparatus to be left of Fig. 1, showing certain parts for communicating motion.

Fig. 2 is an end elevation viewed from the right in Fig. 1.

Fig. 3 is a plan of the apparatus shown in Fig. 1.

Fig. 4 is a similar plan of the same apparatus in a different position, some portions being shown in horizontal section.

Fig. 5 is a plan of portions of the same apparatus in a third position, or after the cable has been stripped.

Figures 6, 7, 8, 9:
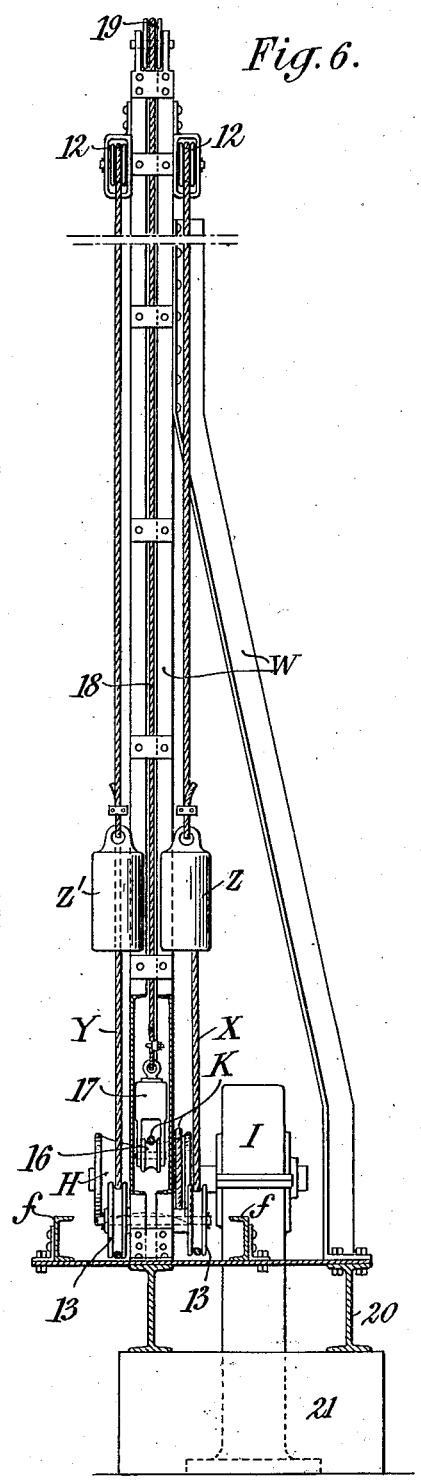

Fig. 5ª is a plan showing a continuation of the apparatus to the left of Fig. 5.

Fig. 6 is a vertical transverse section on the line 6—6 in Fig. 1ª, showing mainly the winding drum and counterweights for imparting motion to the travelers.

Figs. 7, 8 and 9 are transverse sections on the lines 7—7, 8—8 and 9—9, respectively, in Figs. 1 and 3.

Fig. 10 is an elevation of a length of cable to be stripped, showing, with reference thereto, the locations of the respective grippers.

Referring first to Fig. 10, let A designate any ordinary lead-coated electric cable the lead coating of which is severed or weakened at $b$, as by suitable cuts or incisions, so that in stripping it may be pulled off in two sections, $a$ and $a'$; $c$ is the wire cable proper; usually an insulating layer intervenes between the cable and the lead sheathing.

In the practice of the method of stripping according to this invention, the cable A to be stripped is gripped at the three points indicated in Fig. 10, at B, C and D, respectively, the grippers being here shown diagrammatically in dotted lines. Each of the grippers may consist of any suitable pair of jaws adapted to close in upon and grip the cable sheath or cable, as the case may be. These grippers may operate in any suitable manner. For example, the gripper B may first close upon and grip the portion $a'$ of lead sheath; then the gripper C may close upon and grip the sheath $a$ (or B and C might operate simultaneously); thereupon C and B are moved apart, with the result that the sections $a$, $a'$ of the sheath are pulled apart by severing the weakened portion $b$, and this motion is continued until one of them, preferably $a$, is pulled entirely off from the cable $c$. After the cable has been sufficiently uncovered, the gripper D is caused to close in upon and tightly engage and grip the cable $c$. Thereupon grippers D and B are moved apart, whereby the cable is pulled out of the section $a'$ of the sheath, or the latter is pulled off from the cable, as the case may be. After this operation the cable proper, having been stripped of lead, is held by the gripper D, and the two sections of lead sheath are held by the grippers C and B; it is then only necessary to open these respective grippers, whereupon the operator throws the two sections of lead sheath into one receptacle and the stripped cable into another. In practice it is preferable to make the gripper B essentially a vise which after initially gripping the lead sheath $a'$ may remain stationary or essentially so, in which case the gripper C moves to the left in Fig. 10 to strip the lead sheath $a$ from the cable, and the grippers D then close in and grip the cable and then move to the left to pull the cable out from within the lead sheath $a'$. However, any one of the three grippers may be fixedly or immovably mounted, the other two grippers being mounted on suitable travelers for giving them the longitudinal movements necessary to accomplish the stripping.

Preferably the construction shown in the drawings is adopted. The machine here comprises three carriers, E, F and G, all of which may conveniently be constructed as cars having wheels $e$ rolling on longitudinal tracks $f$ which may readily be formed as channel beams, the same tracks serving for the three successive carriers. Such beams confine the wheels $e$ both above and below, and hold the carriers in place, confining their movements to aligned longitudinal movements. The three carriers are thus constructed as cars constituting travelers and controlled in their movements by ropes or cables, as will be described.

The traveler E (which might, however, be stationary) carries the primary gripper B which, to distinguish it from the others, may conveniently be referred to as a vise. The traveler F carries the secondary gripper C. The traveler G carries the cable gripper D.

The three grippers B, C and D are constructed preferably in manner shown, with curved gripping jaws engaging from opposite sides to pinch the cable between them, and preferably serrated to give a firm non-slipping hold thereon. The gripping faces are sufficiently wide to accommodate various sizes of cable to be stripped. The jaws are opened and closed by means of toggle links, whereby longitudinal movements from the operating means may be communicated to the grippers and the travelers in succession.

For imparting these longitudinal movements cables and winding devices are provided. Thus, a drum H driven through a gear box I from an electric motor J, is provided to wind up and thereby pull a cable K (Figs. 1$^a$ and 5$^a$). This cable K is connected to a slide bar L movable in the traveler F (as by being guided in a slideway $g$), and is connected by a pivotal joint at $h$ to links $i$, $i$, which are connected to the ends of levers $j$, $j$, which levers carry the gripping jaws of the gripper C, these levers or jaws being pivoted at $k$, $k$, to the traveler F. When the winding drum H turns to pull the cable K, this pull is communicated through the bar L and links $i$, $i$, to close the gripping jaws C upon the section $a$ of lead sheath of the cable. When the gripping motion is completed, the members $i$, $j$, become rigid and constitute a means for communicating the continued pull of the cable to the traveler F, which accordingly moves toward the left in Fig. 3 to the position shown in Fig. 4, in which operation it strips the lead sheath $a$ from the cable $c$; as shown in Fig. 4, the cable at this time being held fixedly by the grippers B.

The grippers C and carriage F have thus accomplished their operative function, and might stop in this position; but it is more convenient to continue them in movement in order that they may serve for communicating the necessary movements to the next pair of grippers D. For this purpose the traveler G carrying these grippers is connected by a lost motion bar M to the traveler F. The bar M extends longitudinally beneath the bar L, being engaged by a slideway N carried on the traveler F (see Fig. 1), and at its free end it has a cross pin $m$ (or other form of stop shoulder) which, as the traveler F advances, is eventually struck by the advancing end of the slideway N, as shown in Fig. 5$^a$, and thereafter is compelled to travel with the traveler F during the continued movement of the latter. The other end of the bar M is formed with a crosshead M' (see Fig. 5) and connected by two crossed links O, O, to the lever arms P, P (Fig. 5) on which are formed the gripping jaws of the gripper D. The gripper is shown open in Fig. 3 and closed in Fig. 4. It is closed by the movement imparted, as described, to the bar M, communicated through the crossed links O, O. When the grippers D have thus closed upon the cable $c$, the parts M, O, and P become immovable and constitute a means for communicating the further continued movement imparted by the traveler F to the bar M, to the traveler G. Thereafter the two travelers F and G move together, and since the grippers D have taken a firm hold on the cable and the section $a'$ of lead sheathing is held fast by the grippers or vise B, which is stationary, the cable is pulled out from the section $a'$ of lead sheathing in manner shown in Fig. 5.

While the grippers B, constituting the vise for initially holding the portion $a'$ of lead-covered cable, might be operated by hand or in any convenient manner, it is preferable to mount these grippers on a traveler E constructed like the others, as a car, and to give this traveler a limited movement which is utilized to accomplish the opening and closing of the gripping jaws. For this purpose the jaws are mounted on lever arms Q Q pivoted at $n$, $n$, to the traveler E, and connected by links $p$, $p$, to a pin $q$, which constitutes a fixed point, being mounted on a standard $r$ which is bolted fast to the stationary top or table R on which the track beams $f$ are fastened. Consequently the endwise movements of the traveler E are utilized to open and close the jaws of the gripper B. Such movements are communicated from a treadle lever S through a cable T connected to the traveler E at $s$ (Fig. 1), and by an extension T' of this cable passing over a suitable pulley to a counterweight U. On pressing down the treadle the pull on the cable T (which is carried around a pulley $t$) acts to move the traveler E to the right in Fig. 1, which carries the pivotal points $n$, $n$, to the right and opens the jaws of gripper B by the connection of the links $p$ with the fixed point $q$. On releasing the treadle the counterweight U pulls the traveler in the opposite direction and closes the jaws to grip the sheathed cable. The relation of jaws and cable is shown in Fig. 2.

The electric motor J is of the reversible type and is controlled from any suitable electric control box V (Figs. 1 and 7) by an operating lever V'. The electric connections may be made through a cable $u$ in any usual manner, the circuit connections and switch for such control box being so well understood by electricians as to require no illustration. It is sufficient to say that the movement of the lever in opposite directions starts and stops the motor and controls its direction of rotation.

The winding drum H, by pulling the cable K, acomplishes only the traveler movements in the direction required to perform the gripping and stripping operations. The return movement is best accomplished by means of counterweights. It is preferable to provide each traveler F and G with its own counterweight and connecting cable. To give these counterweights sufficient travel a high supporting frame W is provided, as shown in Figs. 1ª and 6. This frame carries sheaves 12 at the top, over which the cables pass, and they are also carried around sheaves 13 at the bottom of this frame. The return cables are lettered X and Y; the cable X connects to the bar L, as shown in Fig. 1, and is carried to the right in that figure, and around a sheave 14 and then back to the left to the upright frame W, around one of the sheaves 13, and up over the top sheave 12, its end being connected to the weight Z. The other cable Y is connected at $v$ (Fig. 1) to the traveler G, being carried thence around a sheave 15 and backwardly around one of the sheaves 13 and up over an upper sheave 12, and connected to the other weight Z', as shown in Fig. 6. When the motor is driven backward to pay off the cable K from the drum H, the weight of the counterweights is made effective to give the return movement to the travelers F and G, and to keep the cable K sufficiently taut. In case the cable K is paid off so rapidly as to develop some slack, it is desirable to take this up by a pulley 16 mounted on a slide 17 which is connected by a cable 18 running over a pulley 19 to a counterweight 20, as shown best in Fig. 1ª.

The several mechanisms described may be mounted in any suitable manner upon any proper support. The mounting shown is a frame consisting of rolled beams 20 as longitudinal members, these being mounted upon a supporting base 21 and carrying above them the horizontal plate or table R. On the plate R are directly fastened the track rails or channels $f$, and the upright counterweight frame W.

The preferable speed at which to drive the travelers in both their active and return movements is approximately one foot per second.

By means of this apparatus the operator performs the following evolutions: He first steps on the treadle to back off the traveler E and open the vise B; he then places the cable (which previously has been incised at $b$) in place, and releasing the treadle it is gripped by the jaws of the vise or gripper B, which are closed together under stress of the counterweight U. He then, by means of the control lever V', starts the motor so that the drum winds up the cable K, its first pull acting to close the grippers C, and thereupon to move the traveler F and thereby cause the grippers to pull the section $a$ of lead sheath off the cable. At the end of this operation, upon taking up the lost motion afforded to the bar M, the stop shoulder afaforded by the pin $m$ on this bar is encountered and the bar communicates movement to first close the grippers D upon the stripped portion of cable $c$, and then, having firmly gripped this, to move the traveler G to the left and thereby pull this cable out from the portion $a'$ of lead sheath which is held fast in the gripper B. At the end of this movement the operator depresses the treadle S, which opens the gripper B; and reverses the motor, which then pays off the cable, and the counterweights Z, Z', acting through their cables, pull back the travelers, thereby successively opening the grippers D and C and releasing the stripped cable and the section $a$ of lead sheath. The operator then removes the cable and the two sections of lead sheathing, all of which are now free. Then while holding down the treadle, he may introduce a new section of cable to be stripped, and the operation is repeated.

It is found in practice that the entire operation takes less than one-half minute in an apparatus in which the traveler F moves eight feet forward and return. The tonnage that can be handled depends on the size of the cable, since it takes the same time for a small as for a large cable. For example, for a cable from one-half inch to one inch diameter, the capacity is three tons per nine hour working day; and for one from three inches to three and one-half inches diameter, the capacity is twelve tons per nine hour day.

While the construction shown and described is the preferable one and has proven highly satisfactory in practice, yet is is to be understood that the invention is not limited to the detailed mechanisms herein set forth, but may be modified within the skill of engineers or designers, and within the scope of the appended claims.

It will be understood that the effective operation of the apparatus involves merely that there be a relative movement between the respective grippers in order to accomplish the stripping of the lead; and except as a matter of mechanical convenience, it is inconsequential which of the grippers remains stationary and which are movable during any operative period.

In the practice of the described method it has been found sufficient to partially sever or weaken the lead sheathing at the point $b$ (Fig. 10) by making one or more cuts with a knife or axe, and this has in practice been done by hand operation prior to putting the sections of cable into the machine for stripping. It may prove desirable to make such cutting means a part of the machine, in which case the cut would best be made between the travelers E and G. Any suitable cutter might be mounted in this location for partly severing the lead sheath at this point. Such cutter, if operated automatically, could be started in operation by the act of releasing the treadle so as to make the weakening cut or cuts just before or just after the cable is gripped by the vise gripper B. Any kind of cutter making a chopping cut is suitable for this purpose, provided that after operating it shall retire far enough to not be in the way of the subsequent stripping operations. With a thin lead sheath it may be possible to pull the portions $a$, $a'$ apart without making any preliminary cut or otherwise weakening the lead sheath between.

I claim as my invention:—

1. An apparatus for stripping lead sheath from cables, comprising gripping means for gripping opposite end portions of the lead sheath, means for separating such gripping means to pull one end portion off from the cable, a gripping means for engaging the stripped portion of the cable, and means for separating such gripping means from the gripping means holding the remaining portion of lead sheath, whereby to strip the latter from the cable.

2. An apparatus according to claim 1, with at least one traveler carrying one of the gripping means and movable to accomplish the separation thereof from another gripping means.

3. Apparatus according to claim 1, having two travelers carrying two gripping means and relatively movable to separate such gripping means, and one of them movable relatively to the third gripping means to separate its gripping means from the third gripping means.

4. Apparatus for stripping lead sheath from cables, comprising gripping means containing a vise for gripping one portion of the lead sheath, a traveler and a gripper carried thereby adapted to grip and by the movement of the traveler to pull off a portion of the sheath, and a second traveler and a gripper carried thereby adapted to grip the stripped portion of the cable and by the motion of the second traveler to pull it out from the portion of sheath held in such vise.

5. An apparatus for stripping lead sheath from cables comprising two gripping means for engaging opposite portions of the sheathed cable, a traveler carrying one of said gripping means and movable to pull off part of the sheath, an intermediate gripping means for engaging the stripped cable, and a second traveler carrying the latter gripping means, with means for imparting subsequent movement to the latter traveler to pull the cable from the portion of sheath held by the other gripping means.

6. Apparatus according to claim 5, with pulling means for operating the first-named traveler, and a lost motion connection for subsequently operating from said pulling means the second-named traveler.

7. In an apparatus for stripping lead sheath from cables, comprising a traveler and a gripper carried thereby, a pull cable connected to the traveler, and power-driven means for pulling said cable, a return cable for imparting backward movement to the traveler, and means for imparting to such return cable a constant stress sufficient to perform such backward movement.

8. In an apparatus for stripping lead sheath from cables, comprising a traveler and a gripper carried thereby, a pull cable connected to the traveler, a power-driven drum for winding said cable, and a return cable and counterweight for imparting return movement to the traveler when the pull cable is paid off from said drum.

9. The described method of stripping lead sheath from cables comprising cutting the sheath, gripping the cable on one side of the cut, gripping the sheathed cable on the opposite side of the cut, then pulling one such gripped portion away from the other and off from the cable, then gripping the stripped core, and forcibly separating such gripped core from the other end portion of the sheath to withdraw the core from the gripped sheath.

In witness whereof, I have hereunto signed my name.

CLARENCE H. SLUGG.